(12) United States Patent
Weisgerber

(10) Patent No.: US 6,243,156 B1
(45) Date of Patent: *Jun. 5, 2001

(54) METHOD FOR EXHIBITING MOTION PICTURE FILMS AT FRAME RATES HIGHER THAN THAT IN WHICH THE FILMS WERE ORIGINALLY PRODUCED

(76) Inventor: Robert C. Weisgerber, 245 E. 93d St., Suite 32A, New York, NY (US) 10128

( * ) Notice: Subject to any disclaimer, the term of this patent is extended or adjusted under 35 U.S.C. 154(b) by 0 days.

This patent is subject to a terminal disclaimer.

(21) Appl. No.: 09/303,450

(22) Filed: May 3, 1999

(51) Int. Cl.[7] .......................... G03B 19/18; G03B 41/00
(52) U.S. Cl. ................................ 352/46; 352/84; 352/81
(58) Field of Search .................. 352/38, 40, 44, 352/81, 84, 92, 167, 239, 46, 97

(56) References Cited

U.S. PATENT DOCUMENTS

| 3,410,954 | * | 11/1968 | Erde | 348/100 |
| 3,511,567 | * | 5/1970 | Dejoux | 355/132 |
| 3,741,636 | * | 6/1973 | Nakayama | 352/180 |
| 4,889,423 | * | 12/1989 | Trumbull | 352/46 |
| 5,096,286 | * | 3/1992 | Weisgerber | 352/40 |
| 5,627,614 | * | 5/1997 | Weisgerber | 352/46 |
| 5,739,894 | * | 4/1998 | Weisgerber | 352/46 |

* cited by examiner

Primary Examiner—Russell Adams
Assistant Examiner—Rodney Fuller
(74) Attorney, Agent, or Firm—David Peter Alan, Esq.

(57) ABSTRACT

A method is disclosed whereby existing on future motion picture films are modified for exhibition at frame rates significantly higher than those used for general theatrical release. Films photographed at customary frame rates (such as 24 frames per second) are printed, with each frame printed twice, onto film for exhibition. The resulting film is shown at double the original frame rate (48 frames per second, for example). The method disclosed here allows more light to pass through the film than is possible with conventional projection methods. The method disclosed here is also compatible with any standard or nonstandard film size or aspect ratio. This method also allows light brightness to be varied for certain scenes or sequences, thereby allowing the viewers to perceive different amounts of visual impact for different scenes or sequences, a feature not available through conventional motion picture exhibition methods.

12 Claims, 1 Drawing Sheet

METHOD FOR EXHIBITING MOTION PICTURE FILMS AT FRAME RATES HIGHER THAN THAT IN WHICH THE FILMS WERE ORIGINALLY PRODUCED

BACKGROUND OF THE INVENTION

Many of the technical advances in film have had as their objective to increase the realism of a motion picture film, as perceived by the viewers of that film. Color and sound films, along with the 70 mm format, were developed in the 1920s. Such nostandard systems as CinemaScope, VistaVision and Cinerama appeared in the 1950s. Today, such systems as IMAX (70 mm with fifteen perforations per frame, traveling horizontally at 24 frames per second) and SHOWSCAN (standard 70 mm film shown at 60 frames per second) provide a degree of realism not available with conventional exhibition methods, but the high cost and nonstandard equipment required of these systems currently limit their use to special venues.

Previous work by the inventor herein has added a degree of realism to motion pictures that can be shown in conventional venues, with a projector specifically designed or adapted for the purpose. Weisgerber (U.S. Pat. No. 5,627, 614 (1997)) teaches the compositing of images photographed or printed at 24 frames per second, with others photographed or printed at 48 frames per second, on the same strip of motion picture film. The resulting film is projected at 48 frames per second, with the result that certain image components retain the artifacts (such is motion blur, graininess and strobescopic effects) that impart the "cinematic" look, while other image components look much more realistic to the viewer. The same invention disclosed the intercutting of highly realistic and "cinematic-looking" scenes or sequences. This method was later extended to other frame rate combinations (U.S. Pat. No. 5,793,894 (1998)).

Existing films for general release in such countries as the United States are photographed and conventionally shown at 24, frames per second. This frame rate limits the quality of presentation to the viewers of such motion pictures, due to the impartation of artifacts such as grain, image instability and flicker. Conventional exhibition of such motion picture films by projecting them at 24 frames per second through a double-bladed shutter delivers 48 image impressions (48 flashes of light) to the viewers per second, but this is not sufficient to reduce the aforementioned artifacts to the point where the viewers cannot perceive them. This is a difficultyuinherent in conventional exhibition of any existing film.

Earlier nonstandard exhibition systems attempted to reduce these artifacts, especially flicker. Cinerama, in use briefly during the late 1950s and early 1960s (films projected onto an extremely wide screen by three synchronized projectors), increased light brightness levels to enhance visual impact, but flicker remained objectionable. To reduce flicker, films were photographed and shown at 26 frames per second (52 flashes per second, since a double-bladed shutter was used), but this rendered motion pictures produced in that format incompatible with the general release format. Later Cinerama films, such as How the West Was Won and The Wonderful World of the Brothers Grimm were shot and presented at the conventional rate of 24 frames per second. Compatibility was increased, but so were flicker and other artifacts inherent at that frame rate. The Todd-AO system, also in limited use at the time, reduced flicker by using a rate of 30 frames Per second, but compatibility with general release formats remained a problem. Until now, the artifacts inherent in 24-fps projection could not be shown to audiences without the negative effects of these artifacts.

While the inventor's previous work disclosed the conversion of existing motion picture films to the format described, the use of his method for exhibiting such films was not fully developed. Accordingly, it is the objective of the present invention to provide a method for exhibiting existing motion picture films at a significantly higher frame rate than is conventionally in use, with the result that viewers of such films will witness a presentation that appears more realistic and produces a greater degree of visual impact than is available with conventional exhibition methods.

BRIEF DESCRIPTION OF THE INVENTION

For many years, the standard format for production and exhibition of motion picture feature films has been 35 mm film photographed and projected at 24 frames per second. While certain artifacts that limit the visual impact upon the viewers of the film are inherent in 24 fps photography, others are imparted by projection at that frame rate. Conventional projection at 24 fps with a double-bladed shutter (48 flashes of light per second) causes flicker and allows film grain to be perceived by the viewers. The amount of light used in conventional projection (typically SMPTE standard of 14 to 16 footlamberts) also limitsivisual impact.

The method described here eliminates or substantially minimizes these artifacts. In the practice of this invention, each frame of a conventional motion picture prepared for general release is printed twice. For example, each frame of a conventional film photographed at 24 frames per second is printed onto two successive frames of film. The resulting film is shown at 48 frames per second through a projector with a double-bladed shutter, which delivers 96 flashes of light to the viewers each second. The use of this high frame rate, along with the double-bladed shutter, delivers enough flashes of light to the viewers to eliminate flicker and randomize existing film grain, thereby substantially increasing the visual impact of the presentation. In addition, the reduced blanking time available in a pin-registered projector allows light to be flashed onto the screen for a greater Portion of total projection time than is feasible with conventional methods. This allows more light (twenty footlamberts or more is possible) to reach the viewers, thereby greatly increasing image brightness, contrast and color saturation.

The method described can be used with any film format. While it will enhance the perceived realism of films produced in the standard 35 mm format, modern films have sufficient resolution to allow conversion to the 70 mm format, with sufficient anamorphic expansion in the horizontal direction to restore the wide-screen 35 mm aspect ratio of 2.35 to 1. Films produced in certain nonstandard guages (such as IMAX, which uses a large film frame and 24 fps projection) can be converted to the format used here through optical printing techniques or computerized imaging methods known in the art. While an IMAX film will lose some impact in the transition from a larger to a smaller film size, the impact-enhancing features of the method described here will recover much more of the impact than would be available with conversion to conventional 35 mm release prints. Moreover, the method described here allows films produced in nonstandard formats to be shown in conventional motion picture theaters, rather than being limited to the special venues for which they were originally produced. In addition, light brightness can be increased or decreased to vary visual impact.

BRIEF DESCRIPTION OF THE DRAWINGS

The drawings show picture information on strips of motion picture film. Audio information, automation commands and other nonpicture information are not depicted.

DETAILED DESCRIPTION OF THE INVENTION

The invention begins with a motion picture intended for general release and distribution. The images on such a film can be imparted thereon by photography of live action, cartoon animation, computerized animation, or any other method known in the cinema art.

Figure 1:
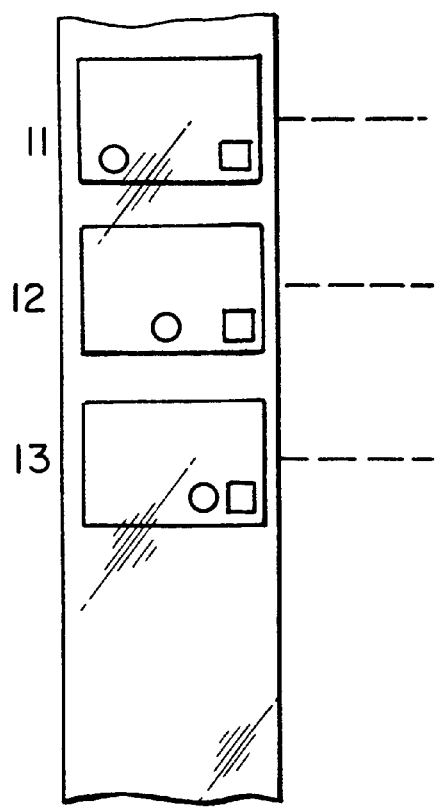
FIG. 1 shows a portion of a strip of motion picture film, designed for projection at a conventional speed, such as 24 frames per second.
Figure 2:
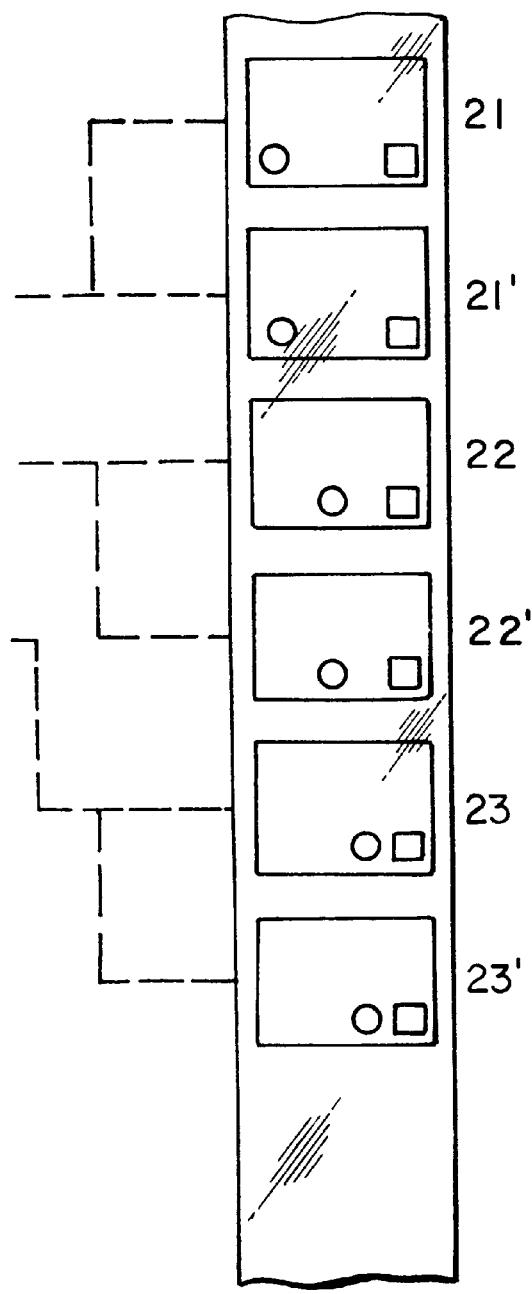
FIG. 2 shows the same images on another strip of motion picture film, converted according to the method described here for projection at double the frame rate at which the strip depicted in FIG. 1 is designed to be shown.

FIG. 1 shows three frames excerpted from such a film. In the illustration, an animated circle is rolling toward a similarly animated square. These frames are designated 11, 12 and 13. It should be noted that the illustrated example would not produce the full beneficial effect of the invention, as would a visually impressive scene. FIG. 2 shows the same three images double-frame printed as frames 21 and 21' (from 11), 22 and 22' (from 12), and 23 and 23' (from 13).

The images shown in FIG. 1 are customarily intended to be shown at 24 frames per second, although other frame rates (such as 16, 18, 25, 26 or 30 frames per second) are compatible with the invention as described. In the practice of the invention, films produced for general release are converted during postproduction for exhibition at double the frame rate at which the general release prints were intended to be shown. Each frame is printed twice. For example, a film intended for general release in the United States is photographed at 24 fps. For exhibition according to the method described, each frame is printed twice, onto two successive frames of film, and the resulting film is projected at 48 frames 196 flashes of light) per second. Other frame rates can also be used. For example, films photographes at 25 frames per second can be double-frame printed and shown at 50 frames (100 flashes of light delivered to the viewers) per second.

This invention does not depend on methods for placing the images onto the film in the first place, or on conversion method. It works with images that are photographed, animated through conventional drawings or computer animation techniques. Conversion can be accomplished through convenional means known in the art, such as optical printing or computerized image transfer. This invention is not intended for the purpose of producing new motion picture films; this purpose was disclosed in the inventor's previous work. It is the objective of this invention to provide a new means of exhibiting existing motion picture films that will provide a greater degree of realism to the viewers of those films than has heretofore been possible.

In the practice of the present invention, a projector with highly accurate pin registration and high-speed pulldown is required. An example of a projector that is recommended for use in the practice of this invention is the Linear Loop projector manufactured by the Pioneer Technology Comp. of Burbank, Calif. A conventional projector with a Geneva movement is also suitable, but it is essential that the projector be capable of sufficiently quick Pulldown and sufficient image stability to allow projection at a rate of 48 frames per second or higher. It is also required that the projector be equipped with a double-bladed shutter, so that 96 or more image impressions are presented to the viewers each second. For films photographed at other frame rates (such as 25 frames per second), the viewers will be presented with four times that many flashes of light per second (100 in this example).

It should be noted that certain "cinematic-looking" artifacts are inherent in photography at conventional frame rates. If only 24 fresh images are photographed every second, the smoothness of interpolation of motion is limited. However, the doubling of the number of film frames involved randomizes film grain below perceptible levels. The presentation of 96 flashes of light each second (as opposed to 48 in conventional exhibition) eliminates flicker by presenting flashes of light so quickly that viewers perceive the light as continuous, rather than intermittent. Even a film photographed originally at sixteen frames per second can be shown at 32 frames per second, with 64 flashes of light, eliminating flicker even in films originally photographed at such a slow frame rate.

The use of such a high frame rate and the reduced blanking time provided by the projectors recommended for use with this invention allows light to hit the screen for a greater percentage of time than is now feasible with conventional motion picture exhibition. Accordingly, the method described is capable of delivering delivering a brighter image than is now available through conventional exhibition methods. A projector that is recommended for use with the method described here is capable of delivering 55% more light than a conventional projector. A light source capable of delivering 10.6 footlamberts of light with a conventional projector can deliver the 16.5 footlamberts recommended by Trunbull for his SHOWSCAN system is U.S. Pat. No. 4,447,160 and previously disclosed by Weisberger in U.S. Pat. No. 5,096,286. Thus, the special light source taught by Trumbull is not needed for the practice of this invention. A light source capable of delivering 12.9 footlamberts with a conventional projector can deliver the twenty footlamberts previously recommended by Weisgerber, With more powerful light sources, higher levels of light brightness are possible.

A new feature of the Present invention is that the level of light brightness delivered to the viewers of the picture can be modulated during the presentation. Commands imparted onto the film through conventional means known in the art can trigger the switching or resistive elements or selection of transformer taps in the power supply delivering power to the projector lamp, thus varying the amount of light delivered to the screen. This allows for certain scenes to appear brighter than other scenes. For example, "conventional" brightness level of about ten footlamberts can be used for scenes where the story line of the film is advanced primarily by dialog between the characters, and higher brightness levels (such as twenty footlamberts) can be reserved for scenes that are more visually impressive. This modulation of light level is in accordance with the method taught by Weisgerber in U.S. Pat. No. 5,627,614 for new films, in which scenes to be shown at high light levels are intercut with scenes to be shown at "conventional" light brightness levels. The present invention extends this feature to currently-existing films.

The method described here can be used with any standard or nonstandard film format. The method also allows conversion from one format into another, for exhibitxon in conventional venues with conventional equipment; although a projector capable of delivering a sufficiently steady image to operate at twice the conventional frame rates is required.

With film stock capable of exceeding the SMPTE standard for resolution of 56 line pairs per milimeter, conventional 35 mm release prints can be converted to the 70 mm format, with sufficient anamorphic expansion in the vertical direction to restore the 35 mm aspect ratio of 1.85 to 1. Films photographed in nonstandard formats, such as IMAX (70 mm, 15 perforations per frame, traveling horizontally) can be converted to a 70 mm format with appropriate anamorphic expansion in the vertical direction, to deliver a more visually impressive presentation than would be available through conversion to the 35 mm format. In the practice of this invention, IMAX films, which are photographed at 24 frames Per second, would be double-frame printed and shown at 48 frames per second.

The examples provided should be viewed as illustrative and not limiting. Other embodiments are possible, and should be considered as lying within the scope of the invention. The invention described here is useful for the conversion of films already produced and released, and it will also be useful for the conversion of new films that will be produced in the future, using conventional or nonstandard film production methods.

The invention claimed is:

1. A method for exhibiting motion picture films to theatrical audiences at high frame rates, with the objective of increasing the visual impact on such audiences when the method described here is used, comprising: the modification of the original film by transferring each image contained in the original film onto two successive frames of the film ultimately to be exhibited to said audiences, and the exhibition of said films so modified at a frame rate double that at which the original film was photographed or the images of the original film were otherwise imparted onto said original film.

2. The method as in claim 1, in which the films so exhibited are shown to said audiences through a projector equipped with a double-bladed shutter, such that the number of flashes of light presented to said audiences during each second is double the frame rate at which said films are projected.

3. The method as in claim 2, in which the films so exhibited were originally photographed or the images of such films were originally imparted onto such films at a frame rate from the group consisting of 16,18,24,25,26 and 30 frames per second.

4. The method as in claim 1, in which said films are exhibited to audiences in the same film format in which said films were originally made.

5. The method as in claim 1, in which films not originally photographed or otherwise produced for exhibition in the 70 mm film format are converted to the 70 mm film format by imparting sufficient anamorphic expansion in the vertical direction to restore the aspect ratio of the film format in which said films were originally photographed or produced for exhibition and exhibited in the 70 mm film format.

6. The method as in claim 1, in which said film are modified through optical printing or computerized image transfer techniques.

7. The method as in claim 1, further comprising a means to vary the level of light brightness provided by the projector light source, from one scene to another, during the exhibition of said films.

8. The method as in claim 7, in which said means is activated by commands imparted onto the film ultimately to be exhibited.

9. The method as in claim 7, in which the level of light brightness for scenes to be exhibited at a low level of light brightness is 10.9 foot lamberts or less.

10. The method as in claim 7, in which the level of light brightness for scenes to be exhibited at a high level of light brightness is 16.5 footlamberts of more.

11. A method for exhibiting previously produced motion picture films at high frame rates comprising printing each frame of said motion film twice and exhibiting such films at double the frame rate at which the original films were made, where the improvement consists of the exhibition of said films at said higher frame rate, with the effect of increasing the visual impact perceived by the persons who view said films.

12. The method as in claim 11, in which the improvement further comprises changing light brightness levels between scenes of said films, with the result that the viewers of said films will perceive certain scenes as more brightly illuminated than other scenes.

* * * * *